United States Patent [19]

Patton, Jr. et al.

[11] Patent Number: 4,490,490

[45] Date of Patent: Dec. 25, 1984

[54] HIGH LOAD BEARING FLEXIBLE POLYURETHANE FOAMS

[75] Inventors: John T. Patton, Jr., Wyandotte; Thirumurti Narayan, Grosse Ile; Louis H. Dumas, Detroit, all of Mich.

[73] Assignee: BASF Wyandotte Corporation, Wyandotte, Mich.

[21] Appl. No.: 497,675

[22] Filed: May 24, 1983

[51] Int. Cl.$^3$ .................... C08G 65/40; C08G 65/42
[52] U.S. Cl. .................................. 521/177; 521/174; 521/175; 521/176
[58] Field of Search ............... 521/137, 170, 174, 176, 521/136, 175, 177

[56] References Cited

U.S. PATENT DOCUMENTS

| | | | |
|---|---|---|---|
| 3,383,351 | 5/1968 | Stamberger | 521/137 |
| 3,652,639 | 3/1972 | Pizzini et al. | 521/137 |
| 3,857,800 | 12/1974 | Fishbein et al. | 521/176 |
| 4,042,537 | 8/1977 | Dahm et al. | 521/137 |
| 4,101,471 | 7/1978 | Russo | 521/137 |
| 4,119,582 | 10/1978 | Matsubara et al. | 521/137 |
| 4,282,331 | 8/1981 | Priest | 521/137 |
| 4,286,074 | 8/1981 | Davis et al. | 521/137 |
| 4,359,550 | 11/1982 | Narayan et al. | 521/160 |

FOREIGN PATENT DOCUMENTS 2033413  5/1980  United Kingdom .

*Primary Examiner*—Veronica P. Hoke
*Attorney, Agent, or Firm*—Joseph D. Michaels

[57] ABSTRACT

Enhanced load-bearing properties for flexible polyurethane foam can be achieved by employing a hydroxyl compound-modified benzyl ether-containing resole polyol as part of the polyol component (5 to 25 weight percent based on polyol) in the preparation of the foam.

8 Claims, No Drawings

HIGH LOAD BEARING FLEXIBLE POLYURETHANE FOAMS

BACKGROUND OF THE INVENTION

1. Field of the Invention

This invention relates to the field of polyurethane foams. In particular, it is directed toward opened-cell, flexible polyurethane foams with enhanced load bearing properties.

2. Description of the Prior Art

Flexible polyurethane foams are, by definition, soft and elastically deformable. Generally, the force required for a given degree of deformation is a function of the density of the foam. The lower the density, the lower the load-bearing properties of the foam. See J. H. Saunders and K. C. Frisch, "Polyurethane Chemistry and Technology, Part II Technology," Interscience Publishers (John Wiley), 1964 at pp. 61–63.

It is known that the load-bearing properties of low density (1–3 pcf) flexible polyurethane foams can be enhanced by increasing the cross-link density of the polymer. This is done by reducing the average equivalent weight or increasing the functionality of the polyol. However, increasing the load-bearing properties by this means commonly results in increased gellation rate causing closed cell formation and shrinkage of the foam (Saunders and Frisch, p. 60). Thus, when higher functionality, lower equivalent weight polyols are added to a flexible foam formulation, cell opening agents must also be used to prevent shrinkage.

It is also known that load-bearing properties of flexible polyurethane foams can be enhanced by adding reinforcing fillers to the formulation (Saunders and Frisch, p. 69; *Journal of Cellular Plastics,* 1981, 43). Such reinforcing fillers can be either inorganic materials (e.g., carbon black, barium sulfate) or organic products such as polyol dispersions of vinyl polymers (U.S. Pat. No. 3,652,639; U.S. Pat. No. 3,383,351), polyhydrazodicarbonamides, (U.S. Pat. No. 3,325,421) or polyisocyanurates (U.S. Pat. No. 4,359,550). These fillers have the common property of providing an insoluble solid phase to the formulation. The resulting foams are both more open-cell and have higher load-bearing properties than foams from the same formulation without added reinforcing fillers. Such two-phase additives, while effective, are relatively more expensive compared to conventional polyols (i.e., those prepared using only alkylene oxide and an initiator). Also, the presence of solids can possibly incur problems during foam preparation due to the separation or coagulation of the solid phase in feed tanks and the plugging of filters and mixing head of the foam machine.

SUMMARY OF THE INVENTION

We have found that hydroxyl compound-modified benzyl ether-containing resole polyols, prepared as disclosed in U.S. patent application Ser. No. 458,283, filed Jan. 17, 1983, now U.S. Pat. No. 4,448,951 issued May 15, 1984 can be used as an additive to enhance the load-bearing properties of flexible urethane foams.

This invention is an improvement in the preparation of a flexible polyurethane foam by reacting a mixture comprising a polyol, an organic polyisocyanate, a blowing agent, a surfactant, and a catalyst for the urethane reaction, wherein the polyol component contains 5 to 25 weight percent of a hydroxyl compound-modified benzyl ether-containing resole polyol obtained by the metal carboxylate catalyzed reaction at 100° C. to 130° C. of a phenol or mixture of phenols, a molar excess relative to the phenolic component of a non-aqueous aldehyde having 1 to 6 carbon atoms, and a modifying amount of an aliphatic hydroxyl compound having 1 to 4 hydroxyl groups, 1 to 12 carbon atoms, and 0 to 5 ether oxygen atoms.

DESCRIPTION OF THE PREFERRED EMBODIMENTS

Addition of hydroxyl compound-modified benzyl ether-containing resole polyols ("modified resole polyol") to a formulatioin used to prepare a flexible polyurethane foam results in a foam with enhanced load-bearing properties. The formulations to which the modified resole polyols are added are those common to the art of making flexible polyurethane foams. In general, they contain a polyhydroxy compound, a polyisocyanate, a blowing agent, a catalyst, a surfactant, and, optionally, other additives to modify the processing behavior or the properties of the resulting foam.

The polyhydroxy compounds used in the art to make flexible polyurethane foams are polyols having average functionalities of about 1.5 to about 3, preferably from about 2 to about 3 and a hydroxyl number of from about 25 to about 60, preferably from about 35 to about 56. Such polyols include hydroxyl-terminated polyesters, polyesteramides, polyacetals but are preferably hydroxyl-terminated polyalkylene polyethers obtained by reaction of lower molecular weight alkylene oxides and polyfunctional initiators. Suitable initiators possess 2 to 4 Zerewitinoff active hydrogen atoms and 2 to about 15 carbon atoms. Examples of such initiators are ethylene glycol; propylene glycol; 1,2-, 1,3- or 1,4-butanediol; di- or tripropylene glycol; glycerine; trimethylolpropane; Bisphenol A; ethanolamine; triisopropanolamine; ethylenediamine, isomeric toluenediamines, and the like. The lower molecular weight alkylene oxide used to react with these initiators contain 2 to 4 carbon atoms and include ethylene oxide, propylene oxide, 1,2- and 2,3-butylene oxide and mixtures thereof. Propylene oxide, and similarly the butylene oxides, can be used as the sole oxide in the manufacture of polyalkylene polyols for use in making polyurethane foam. The simple propylene oxide adduct of glycerine having a hydroxyl number of approximately 56 is the "workhorse" polyol of the flexible polyurethane foam industry. However, to achieve modification of processing or physical properties, propylene oxide is quite often used in combination with ethylene oxide as a mixture to form "heteric polyols" or sequentially to give polyols with internal or terminal oxyethylene blocks. The latter finds utility from the high primary hydroxyl content which gives highly reactive polyols suitable for making high resiliency flexible foam and for use in manufacture of molded flexible foam. A further modification of polyols useful in making flexible polyurethane foams are the so-called "graft" or "polymer" polyols which contain in situ polymerized vinyl monomers, hydrazodicarbonamide, or polyisocyanurate condensates. These organic dispersions are useful in achieving high load-bearing flexible urethane foams. Notwithstanding this latter behavior, the addition of a modified resole polyol to a formulation based on "polymer" dispersion polyol serves to further enhance the load bearing of the foam.

The polyisocyanate used in making flexible polyurethane foams is any organic, preferably aromatic, containing two or more isocyanate groups. Examples of useful isocyanates are 2,4- and 2,6-toluene diisocyanate; 2,2'-, 2,4'- and 4,4'-diphenylmethane diisocyanate, hexamethylene diisocyanate; 4,4'-dicyclohexylmethane diisocyanate; 5-isocyanatomethyl-3,3,5-trimethylcyclohexane isocyanate; polyphenylene polymethylene polyisocyanate; or mixtures thereof. The preferred isocyanates are mixtures of isomeric toluene diisocyanates and mixtures of toluene diisocyanate, diphenylmethane diisocyanate, and polyphenylene polymethylene polyisocyanate (mixture of TDI and crude MDI). The isocyanate is normally used in an amount to provide a ratio of isocyanate groups to alcohol groups ("index") of 0.9 to 1.1, preferably 1.0 to 1.05.

Surfactants used in making flexible polyurethane foam can be nonionic or anionic, hydrocarbon based or siloxane based. Examples include oxyethylated fatty alcohols or acids; alkali metal salts of fatty acids, sulfonic acids, or sulfated alcohols; block polyoxyalkylene and dimethyl siloxane copolymers. The latter "silicone surfactants" are preferred. Surfactants are normally used at the level of 0.1 to 10 parts per hundred parts of polyol.

Blowing agents used in making flexible polyurethane foams are water and low boiling halocarbons such as methylene dichloride and fluorotrichloromethane used individually or in combination with each other. The amount of blowing agent is varied in order to effect the desired foam density.

The catalyst used in the flexible foam formulation is a tertiary organic amine; a carboxylic or mercaptide salt of a heavy metal such as tin, lead, zinc, or cobalt; or a mixture of amine and metal salt. Examples of suitable amines are triethylamine, dimethylaminoethanol, N-methyl- or N-ethyl-morpholine, 1,4-diazabicyclo [2.2.2] octane (DABCO) and examples of suitable metal salts are lead naphthenate, stannous octoate, dibutyltin diacetate, dibutyltin dilaurate, dibutyltin dilauryl mercaptide, zinc diacetate, cobalt naphthenate. Preferred catalysts are diazobicyclooctane, dimethylaminoethanol, stannous octoate, dibutyltin dilaurate, or mixtures thereof.

Optional additives which can be used to modify foam behavior or properties are flame retardants, cell openers, fillers, dyes or pigments, and plasticizers.

The modified resole polyol which is used in the formulation according to this invention is prepared according to the procedure of U.S. patent application, Ser. No. 458,283, filed Jan. 17, 1983, which is incorporated herein by reference. The modified resole polyol is the product of a metal carboxylate catalyzed reaction at 100° C. to 130° C. of a phenol or mixture of phenols, a molar excess relative to the phenol component of an aldehyde having one to six carbon atoms and a modifying amount of an aliphatic hydroxyl compound having 1 to 4 hydroxyl groups, 1 to 12 carbon atoms, and 0 to 5 ether oxygen atoms.

The following examples demonstrate this invention in more specific detail but are not to be considered limiting. Unless otherwise indicated, all parts given are by weight.

Abbreviations used in the examples are:

Polyol I—A 56 hydroxyl number, alkali metal hydroxide catalyzed propylene oxide adduct of glycerine
Polyol II—A 36 hydroxyl number polyol containing 30 percent in situ polymerized acrylonitrile-styrene in a propylene oxide-ethylene oxide (internal block) adduct of glycerine
Polyol III—A 35 hydroxyl number alkali metal hydroxide catalyzed propylene oxide-ethylene oxide (terminal block) adduct of glycerine
DABCO 33LV—33 percent solution of diazobicyclooctane in dipropylene glycol sold by Houdry Division, Air Products and Chemicals
Silicone Surfactants—L6202 and L5303 are silicone surfactants sold by Union Carbide Corporation for use with conventional or graft hot cure foams and for high resiliency foams, respectively
TDI—80:20 ratio of 2,4- and 2,6-toluene diisocyanate sold by BASF Wyandotte Corporation
TDI/CMDI—80:20 weight ratio of above TDI and a 2.7 functionality crude diphenylmethane diisocyanate
ILD Indentation Load Deflection measured on pads one inch in thickness
CLD Compression Load Deflection measured on pads one inch in thickness

PREPARATION OF MODIFIED RESOLE POLYOL

Example 1

A mixture of 112.5 parts of 91 percent paraformaldehyde, 205.2 parts of phenol, 31.6 parts of 1,4-butanediol, and 0.84 parts of lead naphthenate (29 percent Pb) was stirred and heated in a reactor fitted with a mechanical stirrer, a thermometer, provision for operation at reduced pressure, and a condenser suited for either total reflex or distillate take-off. The mixture was heated at total reflux (100° C. to 125° C.) for four hours and distillate (37.5 parts) was then collected during the following four hours while the temperature of the reaction mixture was maintained at 110° C. to 120° C. Residual water was then removed by distillation at reduced pressure with a reactor temperature of about 80° C. The stripped product had a viscosity of 640,000 cps at 25° C., a hydroxyl number of 500, and a water content of 0.22 weight percent.

PREPARATION OF FLEXIBLE URETHANE FOAMS

Hot Cure Foams were prepared from both a conventional polyol (Table I) and a vinyl polymer modified polyol (Table II).

Example 2 and 3

In each example, the polyol, the modified resole polyol, surfactant, distilled water, and amine catalyst as shown in Table I were mixed for 30 seconds in a cup using a Lighting Model V-7 stirrer fitted with a 1.5 inch shrouded mixing blade. The tin catalyst was then added and the mixing continued for an additional 15 seconds. The isocyanate (TDI) was then added to the polyol-catalyst blend and vigorously mixed for 5 seconds and the mixture poured into an opened top mold. The foam was allowed to rise completely and then cured in an oven at 120° C. for five minutes.

Comparative Example A

Using the equipment and procedure given for Examples 2 and 3, the formulation listed in Table I (without modified resole polyol) was used to prepare a flexible foam sample. Comparison of the properties of this foam with those of Examples 2 and 3 shows the improvement in load bearing resulting from the use of the modified resole polyol.

TABLE I

| Example Number:<br>Comparative Example | A | 2 | 3 |
|---|---|---|---|
| Formulation: (pbw) | | | |
| Polyol I | 300 | 285 | 285 |
| Mod. Resole Polyol of Ex. 1 | — | 30 | 60 |
| Stannous Octoate | 0.4 | 0.1 | 0.1 |
| DABCO 33LV | 1.0 | 1.0 | 1.0 |
| Silicone Surfactant (L6202) | 3.0 | 4.0 | 3.0 |
| Distilled Water | 11.4 | 11.4 | 11.4 |
| TDI | 119 | 144.6 | 170.2 |
| Foam Properties: | | | |
| Density, pcf | 1.65 | 1.95 | 1.76 |
| ILD, 50% deflect., psi | 1.8 | 2.4 | 3.6 |
| CLD, 50% deflect., psi | 0.49 | 0.74 | 1.02 |

Examples 4 and 5, Comparative Example B

Using the equipment and procedure described in Examples 2 and 3 and the formulations given in Table II, flexible foams were prepared from a vinyl polymer-modified polyol. Comparisons of the foam properties of Examples 4 and 5 products with that of Comparative Example B shows the beneficial effect of adding modified resole polyol to this formulation. It is particularly noteworthy that this load-bearing enhancement occurs even through the level of load bearing is already quite high due to the use of the polymer containing polyol.

TABLE II

| Example Number:<br>Comparative Example | B | 4 | 5 |
|---|---|---|---|
| Formulation: (pbw) | | | |
| Polyol II | 300 | 285 | 285 |
| Mod. Resole Polyol of Ex. 1 | 0 | 30 | 60 |
| Stannous Octoate | 0.4 | 0.4 | 0.2 |
| DABCO 33LV | 10 | 10 | 10 |
| Silicone Surfactant (L6202) | 3 | 3 | 3 |
| Distilled Water | 9 | 9 | 9 |
| TDI | 108.8 | 123.5 | 159 |
| Foam Properties: | | | |
| Density, pcf | 1.79 | 1.80 | 1.81 |
| ILD, 50% deflect., psi | 5.4 | 7.2 | 12.0 |
| CLD, 50% deflect., psi | 1.17 | 1.43 | 2.63 |

High Resilience Foams are prepared from highly reactive polyols (primary hydroxyl terminated) which, in turn, normally necessitate the use of cell-opening agents in the formulation to avoid shrinkage of the resultant foam.

Examples 6 and 7

Using the equipment and procedure of Example 2 and 3, the formulations given in Table III were used to prepare flexible foam samples. No tin catalyst was used and the isocyanate consisted of a 4:1 weight ratio of TDI and crude MDI.

Comparison Examples C and D

For comparison with Examples 6 and 7, the foam preparation was repeated with the same formulation except that no modified resole polyol was used and 0.1 part of tin catalyst was used in lieu of the catalyst present in the missing resole polyol. The foam from Comparative Example C shrank excessively and could not be tested. Replacement of the modified resole polyol with a polyfunctional sucrose-based polyol having essentially the same hydroxyl number (Comparative Example D) also gave a foam which could not be tested due to excessive shrinkage.

The foams from Examples 6 and 7 show clearly the beneficial effect of using the modified resole polyol in the formulation. Not only does the added resole polyol serve to prevent shrinkage but also enhances load-bearing properties as shown by the increased values obtained with increase in amount of resole polyol.

TABLE III

| Example Number:<br>Comparative Example | C | D | 6 | 7 |
|---|---|---|---|---|
| Formulation: (pbw) | | | | |
| Polyol III | 300 | 283 | 283.5 | 276 |
| Mod. Resole Polyol of Ex. 1 | 0 | 0 | 31.5 | 69 |
| Sucrose-based Polyol | 0 | 31.8 | 0 | 0 |
| Dibutyltin dilaurate | 0.1 | 0.1 | — | — |
| DABCO 33LV | 1.5 | 1.5 | 1.5 | 1.5 |
| Silicone Surfactant (L5303) | 4.0 | 4.0 | 4.0 | 6.0 |
| Distilled Water | 9.0 | 9.0 | 9.0 | 9.0 |
| TDI/CMDI | 119.3 | 147.2 | 147.2 | 175.5 |
| Foam Properties: | | | | |
| Density, pcf | Foam Shrank | Foam Shrank | 1.89 | 1.95 |
| ILD, 50% deflect., psi | | | 1.5 | 2.8 |
| CLD, 50% deflect., psi | | | 0.51 | 0.97 |

The embodiments of the invention in which an exclusive privilege or property is claimed are defined as follows:

1. In the process for the preparation of a flexible polyurethane foam by reacting a mixture comprising a polyol, an organic polyisocyanate, a blowing agent, a surfactant, and a catalyst for the urethane reaction, the improvement wherein the polyol component is a mixture of 95 to 75 weight percent of a polyol having a functionality of about 1.5 to about 3.0 with a hydroxyl number of about 25 to about 60 and 5 to 25 weight percent of a hydroxyl compound-modified benzyl ether-containing resole polyol obtained by the metal carboxylate catalyzed reaction at 100° C. to 130° C. of a phenol or mixture of phenols, a molar excess relative to the phenolic component of a non-aqueous aldehyde having 1 to 6 carbon atoms, and a modifying amount of an aliphatic hydroxyl compound having 1 to 4 hydroxyl groups, 1 to 12 carbon atoms, and 0 to 5 ether oxygen atoms.

2. The process of claim 1 wherein the polyol constituting 95 to 75 weight percent of the polyol component is a polyether polyol derived from alkylene oxides having 2 to 4 carbon atoms.

3. The process of claim 1 wherein the polyol constituting 95 to 75 weight percent of the polyol component is a polymer modified polyether polyol in which the polymer is selected from the group consisting of vinyl polymer, polyisocyanurate, and polyhydrazodicarbonomide.

4. The process of claim 1 wherein the modified resole polyol is prepared from phenol, formaldehyde, and 1,4-butanediol.

5. Flexible polyurethane foam prepared by the reaction of a mixture comprising a polyol, an organic polyisocyanate, a blowing agent, a surfactant, and a catalyst for the urethane reaction, wherein the polyol component is a mixture of 95 to 75 weight percent of a polyol having a functionality of about 1.5 to about 3.0 with a hydroxyl number of about 25 to about 60, and 5 to 25 weight percent of a hydroxyl compound-modified benzyl ether-containing resole polyol obtained by the metal carboxylate catalyzed reaction at 100° C. to 130° C. of a phenol or mixture of phenols, a molar excess relative to the phenolic component of a non-aqueous aldehyde having 1 to 6 carbon atoms, and a modifying amount of an aliphatic hydroxyl compound having 1 to 4 hydroxyl groups, 1 to 12 carbon atoms, and 0 to 5 ether oxygen atoms.

6. The product of claim 5 wherein the polyol constituting 95 to 75 weight percent of the polyol component is a polyether polyol derived from alkylene oxides having 2 to 4 carbon atoms.

7. The product of claim 5 wherein the polyol constituting 95 to 75 weight percent of the polyol component is a polymer modified polyether polyol in which the polymer is selected from the group consisting of vinyl polymer, polyisocyanurate, and polyhydrazodicarbonomide.

8. The product of claim 5 wherein the modified resole polyol is prepared from phenol, formaldehyde, and 1,4-butanediol.

* * * * *